United States Patent Office.

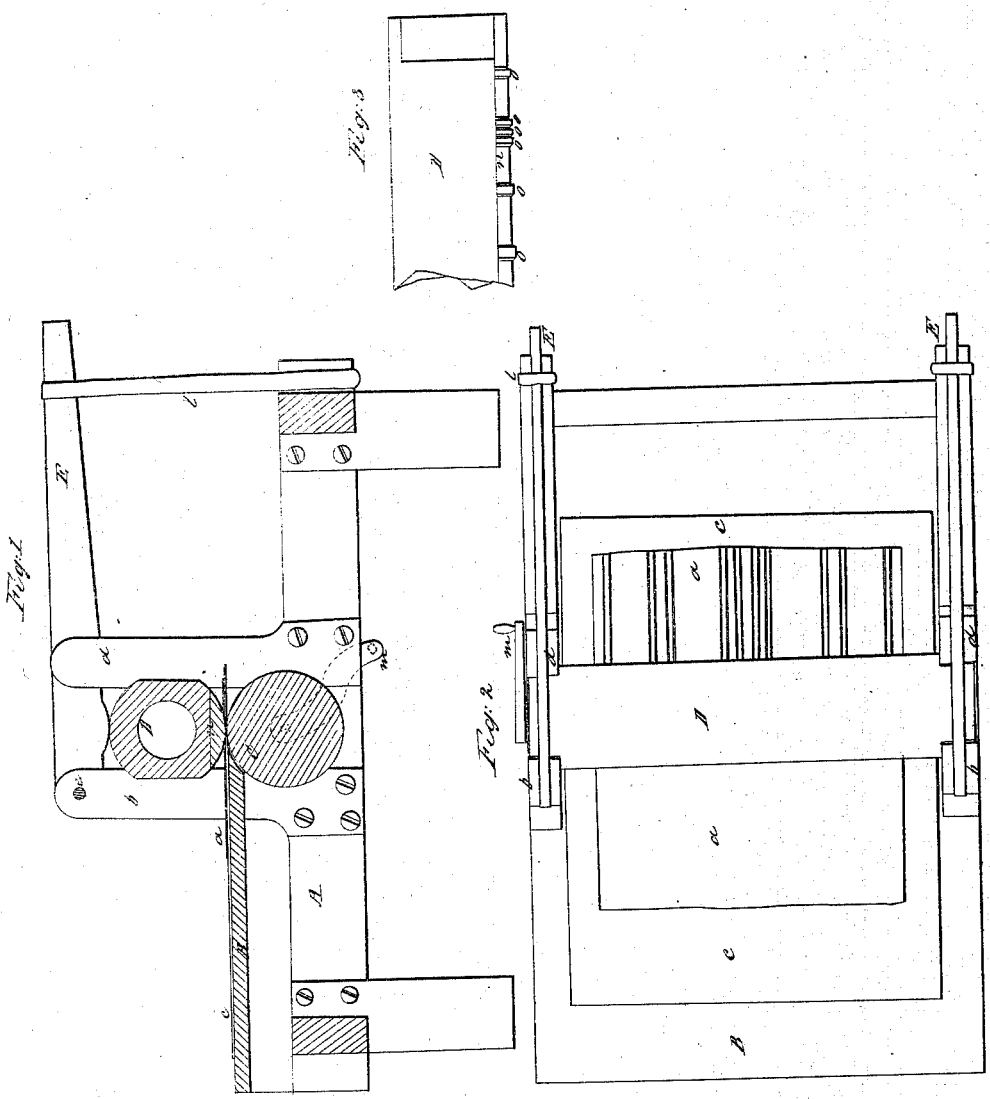

IMPROVED EMBOSSING MACHINE.

JAMES C. ARMS, OF NORTHAMPTON, MASSACHUSETTS.

*Letters Patent No. 60.115, dated December 4, 1866.*

SPECIFICATION.

TO ALL WHOM IT MAY CONCERN:

Be it known that I, J. C. ARMS, of Northampton, in the county of Hampshire, and State of Massachusetts, have invented certain new and useful improvements in Embossing Machines; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

Figure 1 is a longitudinal vertical section.

Figure 2 is a top plan view; and

Figure 3 is a view of a portion detached.

My invention has for its object the production of a machine for embossing and ornamenting leather, cloth, and similar material to be used in the manufacture of pocket-books, wallets, and similar articles.

A represents a frame, of any suitable size, upon which is mounted a platform, B. Midway of the frame is secured a cylinder, C, mounted in suitable bearings to permit it to revolve freely, and having a crank, $m$, attached for operating it. D represents a hollow cylinder, located directly over the cylinder C, as shown in fig. 1, this upper cylinder D being held in position between the standards $b$ and $d$, in such a manner as to permit it to move vertically to a limited extent, but not to revolve. A lever E is pivoted at $e$ to the standard $b$, and bears upon the cylinder D, the end of the lever being held down by an elastic band $l$, as shown. The under side of the cylinder D is flattened to permit a piece, $n$, to be attached, as shown in fig. 1, so that the piece $n$ may be removed and another substituted at pleasure. This piece $n$ has a series of projections, $o$, formed on it circumferentially, as shown in fig. 3, for the purpose of pressing and forming grooves or marks on the material to be embossed. The object of making the cylinder D hollow, is to heat it by introducing into its interior a jet of gas or steam, or a heated iron, the cylinder D being made of metal for that purpose. By these means the embossing plate $n$ is kept heated to any required degree. The cylinder C has its surface covered with sand-paper, or is otherwise roughened, so as to take hold upon any substance presented it, and, as the cylinder is rotated, draw the material through between it and the plate $n$ above it.

The operation is as follows: A sheet of pasteboard, $c$, is placed on the table or platform B, and the piece of leather, or other material, $a$, is laid on it. By turning the crank $m$, the pasteboard, with the piece of leather upon it, is drawn forward and passed under the heated plate $n$, the projections $o$ of which indent it with corresponding marks, as represented in fig. 2. By having a series of plates, $n$, a variety of patterns may thus be formed at will; and by taking a piece having the straight marks formed on it, and laying it diagonally on the pasteboard, and passing it through in that position, the pattern may be formed into checks or diamonds, and thus still further ornamented. It is obvious that instead of the levers, springs may be placed directly over the ends of the cylinder D, and that the heater D may be made square, or in any other form, instead of round.

Having thus described my invention, what I claim, is—

1. The embossing machine, constructed and arranged to operate as and for the purpose substantially as set forth.

2. The heater D, provided with the removable embossing plate $n$, as shown and described.

JAMES C. ARMS.

Witnesses:
 ENOS PARSONS,
 C. A. BRONSON.